United States Patent [19]
Shimada et al.

[11] Patent Number: 5,623,665
[45] Date of Patent: Apr. 22, 1997

[54] ELECTRONIC APPARATUS FOR PATCHING A READ-ONLY MEMORY

[75] Inventors: Keiichiro Shimada; Sunao Furui, both of Kanagawa, Japan

[73] Assignee: Sony Corporation, Tokyo, Japan

[21] Appl. No.: 404,115

[22] Filed: Mar. 13, 1995

Related U.S. Application Data

[63] Continuation of Ser. No. 1,311, Jan. 6, 1993, abandoned.

[30] Foreign Application Priority Data

Jan. 13, 1992 [JP] Japan .................................. 4-004092

[51] Int. Cl.$^6$ .................................................. G06F 11/00
[52] U.S. Cl. ........................... 395/182.03; 395/182.06; 395/185.06; 364/DIG. 1; 364/245.3
[58] Field of Search ..................... 364/DIG. 1, DIG. 2; 371/8.1; 395/182.06, 700

[56] References Cited

U.S. PATENT DOCUMENTS

| | | | |
|---|---|---|---|
| 4,028,678 | 6/1977 | Moran | 340/172.5 |
| 4,028,679 | 6/1977 | Divine | 340/172.5 |
| 4,028,683 | 6/1977 | Divine et al. | 340/172.5 |
| 4,028,684 | 6/1977 | Divine et al. | 340/172.5 |
| 4,051,460 | 9/1977 | Yamada et al. | 364/900 |
| 4,095,278 | 6/1978 | Kihara | 364/900 |
| 4,150,428 | 4/1979 | Inrig et al. | 364/200 |
| 4,218,757 | 8/1980 | Drogichen | 364/900 |
| 4,291,375 | 9/1981 | Wolf | 364/483 |
| 4,296,470 | 10/1981 | Fairchild et al. | 364/200 |
| 4,319,343 | 3/1982 | Powell | 365/189 |
| 4,400,798 | 8/1983 | Francis et al. | 365/174 |
| 4,424,574 | 1/1984 | Enoki et al. | 364/900 |
| 4,456,966 | 6/1984 | Bringol et al. | 364/900 |
| 4,490,783 | 12/1984 | McDonough et al. | 364/200 |
| 4,490,812 | 12/1984 | Guterman | 364/900 |
| 4,517,643 | 5/1985 | Bannai | 364/200 |
| 4,542,453 | 9/1985 | Patrick et al. | 364/200 |
| 4,571,677 | 2/1986 | Hirayama et al. | 364/200 |
| 4,610,000 | 9/1986 | Lee | 365/189 |
| 4,620,273 | 10/1986 | Mitani et al. | 364/136 |

(List continued on next page.)

FOREIGN PATENT DOCUMENTS

| | | |
|---|---|---|
| 0263447A2 | 4/1988 | European Pat. Off. . |
| 0428005A2 | 5/1991 | European Pat. Off. .......... G06F 9/26 |
| 0458559A2 | 11/1991 | European Pat. Off. . |
| 62-249231 | 10/1987 | Japan . |
| 1065633 | 3/1989 | Japan . |
| 1099129 | 4/1989 | Japan . |
| 1114941 | 5/1989 | Japan . |

OTHER PUBLICATIONS

Ser. No. 08/122,904 Sep. 19, 1992 Yamamoto et al. Filing Date Sep. 16, 1993.

H. Trinh, "Short and Long ROS Patch," *IBM Technical Disclosure Bulletin*, vol. 24, No. 3, Aug. 1981, pp. 1379–1382.

D. P. Siewiorek, C. Gordon Bell, Allen Newell, *Computer Structures: Principles and Examples*, pp. 581, 612–614, copyright 1974, 1982.

"Dual Indirect RAM/ROM Jump Tables For Firmware Updates", IBM Technical Disclosure Bulletin, vol. 31, No. 1, Jun. 1988.

"Applications For Microcomputers with E$^2$PROM", C. Melear, Electro/86 and Mini/Micro Northeast 11 (1986), Conference Record, Los Angeles, CA, USA, pp. 1–9.

(List continued on next page.)

*Primary Examiner*—Kevin A. Kriess
*Assistant Examiner*—Kakali Chaki
*Attorney, Agent, or Firm*—Limbach & Limbach LLP

[57] ABSTRACT

A unitary electronic device includes a CPU, a RAM, a ROM for storing a processing program for the CPU which program includes a command to execute, at each processing cycle of the CPU, the processing located at a predetermined address in the RAM, and an input means or the like, for entering in the RAM at the predetermined address, information for correcting a defect in the processing program stored in the ROM.

9 Claims, 3 Drawing Sheets

U.S. PATENT DOCUMENTS

| | | | |
|---|---|---|---|
| 4,709,324 | 11/1987 | Kloker | 364/200 |
| 4,727,476 | 2/1988 | Rouchon | 364/200 |
| 4,745,572 | 5/1988 | Wilburn | 364/900 |
| 4,751,703 | 6/1988 | Picon et al. | 371/10 |
| 4,769,767 | 9/1988 | Hilbrink | 364/200 |
| 4,802,119 | 1/1989 | Heene et al. | 364/900 |
| 4,819,154 | 4/1989 | Stiffler et al. | 364/400 |
| 4,831,517 | 5/1989 | Crouse et al. | 364/200 |
| 4,905,200 | 2/1990 | Pidsosny et al. | 364/300 |
| 4,942,541 | 7/1990 | Hoel et al. | 364/519 |
| 4,972,481 | 11/1990 | Santesson | 380/49 |
| 5,051,897 | 9/1991 | Yamaguchi et al. | 364/200 |
| 5,063,499 | 11/1991 | Garber | 395/500 |
| 5,077,737 | 12/1991 | Leger et al. | 371/10.1 |
| 5,199,032 | 3/1993 | Sparks et al. | 371/3 |
| 5,214,771 | 5/1993 | Clara et al. | 395/500 |
| 5,289,416 | 2/1994 | Iwai et al. | 365/200 |
| 5,305,460 | 4/1994 | Kaneko et al. | 395/775 |
| 5,357,627 | 10/1994 | Miyazawa et al. | 395/575 |
| 5,408,672 | 4/1995 | Miyazawa et al. | 395/800 |
| 5,454,100 | 9/1995 | Sagane | 395/182.06 |

OTHER PUBLICATIONS

On–Site ROS patch mechanism, IBM Technical disclosure bulletin, vol. 30, No. 5, Oct. 1987.

Sagane, Ser. No. 08/199,347 Sep. 9, 1993.

Yamamoto et al. Ser. No. 08/110,818 Aug. 23, 1993.

Yamamoto et al. Ser. No. 08/004,932 Jan. 15, 1993.

Patent Abstracts of Japan, vol. 7, No. 67 (P–184), 19 Mar. 1983 & JP–A–57 211 651 (Tokyo Shibaura Denki KK), 25 Dec. 1982.

Patent Abstracts of Japan, vol. 14, No. 90 (P–191), 14 Apr. 1983 & JP–A–58 016 350 (Tokyo Shibaura Denki II), 31 Jan. 1983.

Patent Abstracts of Japan, vol. 14, No. 64 (P–1002), 6 Feb. 1990 & JP–A–01 286 029 (Sugawa Kazuyuki), 17 Nov. 1989.

Charlie Melear: "Applications for Microcomputers with E$^2$PROM." Electro/86 and Mini/Micro Northeast 11 (1986), Conference Record, Los Angeles, CA, USA, pp. 1–9.

IBM Technical Disclosure Bulletin, vol. 26, No. 10B, Mar. 1984, New York, USA, pp. 5606–5607, L. Weiss: "Patch microcode change level check".

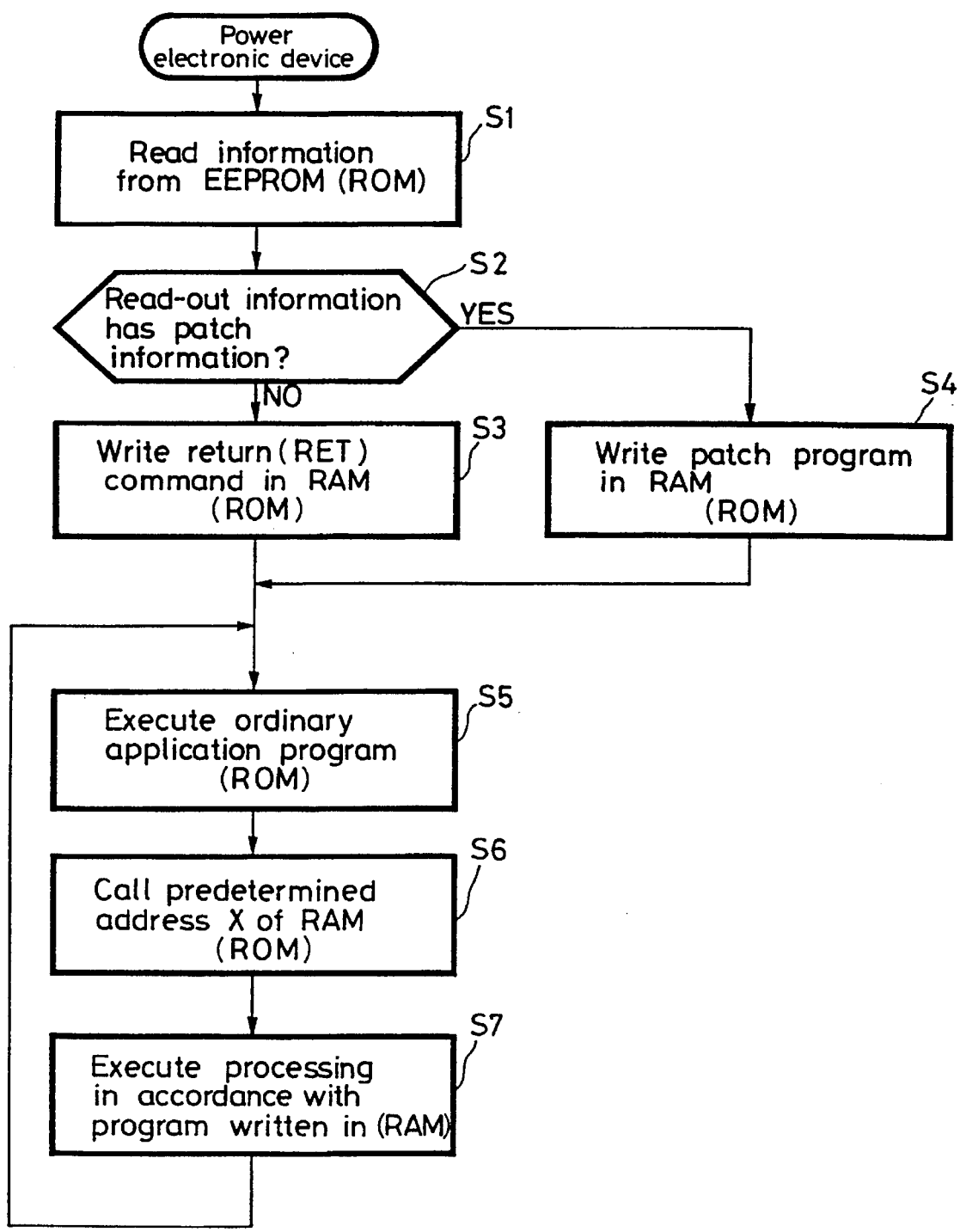

ELECTRONIC APPARATUS FOR PATCHING A READ-ONLY MEMORY

This is a continuation of application Ser. No. 08/001,311 filed on Jan. 6, 1993 abandoned.

BACKGROUND OF THE INVENTION

1. Field of the Invention

The present invention relates to an electronic apparatus such as a one-chip microcomputer incorporation in electronic devices, for example.

2. Description of the Prior Art

One-chip microcomputers incorporated in electronic devices are constructed by electronic apparatus in which a fixed memory means (ROM), a processing means (CPU), an input means, a variable memory means (RAM), etc., are unitarily integrated.

In such an electronic apparatus (one-chip microcomputer), a processing program for the processing means (CPU) is stored in the fixed memory means (ROM). That is, a particular processing is carried out in accordance with an information (processing program) stored in the fixed memory means (ROM). Therefore, if this fixed memory means (ROM) is formed by a mask ROM, then such electronic apparatus can be mass-produced inexpensively.

The above electronic apparatus are incorporated in electronic devices such as a consumer video tape recorder having a built-in camera, a small video deck or the like. Recently, electronic apparatus have been designed to have multiple functions in order to discriminate products. As a result, the amount of information (processing program) stored in the fixed memory means (ROM) is increased. In particular, as the size of the processing program is increased considerably, the occurrence of bug therein cannot be avoided.

If such bug is discovered after the electronic apparatus has been mass-produced, the mass-produced apparatus must be abandoned or mass-produced one more time. Further, external parts for patching the bug must be added to the electronic apparatus. If electronic apparatus are mass-produced one more time, then a lot of additional costs become necessary. Furthermore, external parts cannot be substantially mounted on electronic devices because the electronic device has many electronic parts mounted therein with high density.

To solve the above problems, the assignee of the present application has previously proposed a means that can correct such bug after electronic devices have been mass-produced (see Japanese Patent Application No. 3-118799). To be more concrete, according to this previously-proposed means, an electronic device includes therein a patch information memory means for patching a bug and an access change-over means. Then, a defective or bug portion of the information stored in the fixed memory means is identified and the access is changed over from the fixed means to the patch information memory means at that defective or bug portion.

In this previously-proposed means, however, the design of the electronic device itself (hardware) must be changed such as when there are provided the patch information memory means and the access change-over means. Therefore, this previously-proposed means cannot be applied to the existing electronic devices with ease.

OBJECTS AND SUMMARY OF THE INVENTION

Therefore, it is an object of the present invention to provide an improved electronic device in which the aforementioned shortcomings and disadvantages encountered with the prior art can be eliminated.

It is another object of the present invention to provide an electronic device in which a bug in an information stored in a fixed memory can be patched by an information from a variable memory so that a bug which has been discovered after mass-production can be corrected without changing the design of existing electronic devices.

It is still another object of the present invention to provide an electronic device which can achieve remarkable effects from a manufacturing standpoint.

According to an aspect of the present invention, there is provided an electronic device which comprises a fixed memory in which an information is stored in a fixed state, a processing unit for effecting a processing in accordance with the information stored in the fixed memory, an input device for being input with an information from the outside, and a variable memory in which an information input by the input device is stored. The fixed memory, the processing unit, the input device and the variable memory are unitarily integrated, wherein the information stored in the fixed memory includes a command for executing a processing in accordance with a predetermined address information of the variable memory. Also a patch information for patching a bug of the information stored in the fixed memory is written in the predetermined address of the variable memory.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 4 is a flowchart to which references will be made in explaining operation of the electronic device according to the present invention.

DETAILED DESCRIPTION OF THE PREFERRED EMBODIMENT

The present invention will hereinafter be described with reference to the drawings.

Figure 1:
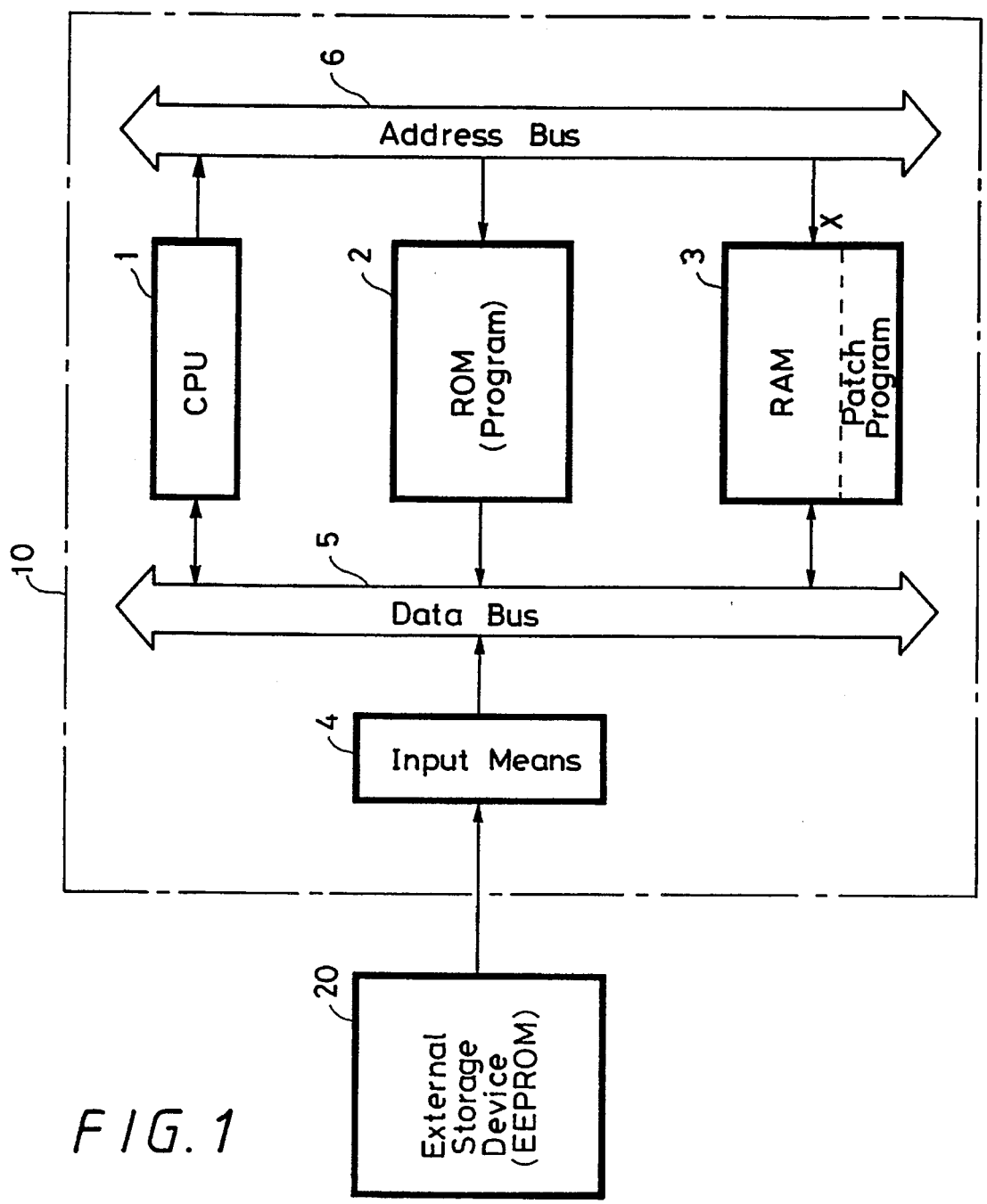
FIG. 1 is a block diagram showing a circuit arrangement of an electronic device according to an embodiment of the present invention.

In FIG. 1 of the accompanying drawings, reference numeral 10 generally designates an overall arrangement of a one-chip microcomputer serving as an electronic device. The electronic device 10 includes a CPU (central processing unit) 1 serving as a processing means, a ROM (read only memory) 2 serving as a fixed memory means, a RAM (random access memory) 3 serving as a variable memory means, and an input means 4 or the like. The CPU 1, the ROM 2, the RAM 3 and the input means 4 are connected to one another via a data bus 5. An address output formed by the CPU 1 is supplied through an address bus 6 to address inputs of the ROM 2 and the RAM 3.

An external storage device 20 is connected to the input means 4. This external storage device 20 also is disposed within the electronic device 10. The external storage device 20 is formed of, for example, an EEPROM (electrically erasable and programmable ROM) in which there are generally stored parameters, etc., obtained in the adjustment process of the electronic device. An information from the external storage device 20 is supplied through the input means 4 to the RAM 3, in which it is stored so as to be utilized in the processing in the CPU 1.

In such electronic device 10, an information of a processing program at the CPU 1 is stored in the ROM 2 in a fixed state. In this processing program, there is provided a command which executes a processing in accordance with an information stored in a predetermined address X of the RAM 3 at every predetermined cycle. In the external storage device 20, there are stored an information (described later on) for patching a bug of the information stored in the ROM 2, if necessary, together with the above parameters obtained in the adjustment process.

Figure 2:
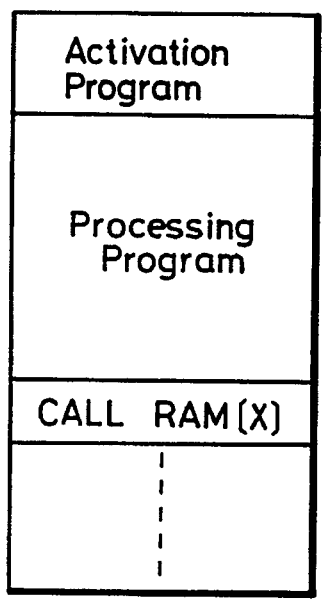
FIG. 2 is a diagram used to explain the electronic device according to the present invention.

As shown in FIG. 2 of the accompanying drawings, in the ROM 2, there is initially provided an activation program. Then, there is also provided a processing program for the CPU 1. This processing program includes a command for calling (CALL) the predetermined address X of the RAM 3, for example, at every predetermined cycle.

Figure 3:
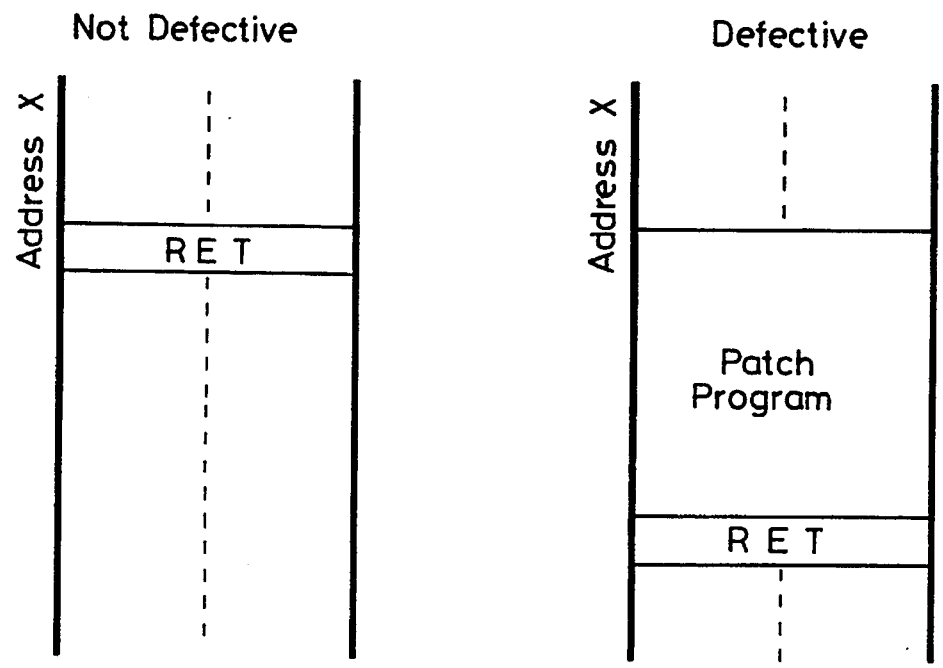
FIG. 3 is a diagram used to explain the electronic device according to the present invention.

In the predetermined address X of the RAM 3, there is stored an information for patching a bug of the information stored in the ROM 2 from the external storage device 20 through the input means 4. More specifically, in FIG. 3 of the accompanying drawings, when the information stored in the ROM 2 has no bug, a return (RET) command is provided in the predetermined address X. On the other hand, when the information stored in the ROM 2 has a bug, there is provided a program for patching the bug of the information from the predetermined address X of the RAM 3.

The return (RET) command is provided at the end of the patch program.

Therefore, an operation shown in a flowchart of FIG. 4, for example, is carried out in the electronic device 10.

Referring to FIG. 4, when the power switches of the electronic device or electronic apparatus 10 are turned on, an information from the external storage device 20 is stored in the RAM 3, at step S1. It is determined in the next decision step S2 whether or not the read information includes the program for patching the bug on the information stored in the ROM 2. If a NO is output at decision step S2, then the processing proceeds to step S3, whereat a return (RET) command is written in the predetermined address X of the RAM 3.

If the read-out information has the patch program for patching the bug as represented by a YES at decision step S2, then the processing proceeds to step S4, whereat the bug patch program from the external storage device 20 is written in the predetermined address X of the RAM 3. The end of this patch program includes a return (RET) command.

In the next step S5, the processing is executed in accordance with the information program stored in the ROM 2 by the CPU 1. In step S6, the predetermined address X of the RAM 3 is called (CALL). Thus, in step S7, the processing is executed in accordance with the bug patch program from the predetermined address X of the RAM 3 by the CPU 1. After step S7 has ended, the processing is returned to step S5.

As described above, according to the electronic device of the present invention, although the defect of the information stored in the fixed memory means (ROM 2) is once executed, the bug is patched by the information from the variable memory means (RAM 3) the program can totally compensate for the bug. Therefore, the design of the existing electronic device 10 (CPU 1, ROM 2, RAM 3, input means 4, etc.) itself need not be varied and the bug that was discovered after the electronic devices had been mass-produced can be patched.

In the above-mentioned flowchart, steps S1 through S6 are all executed in accordance with the program stored in the ROM 2. Further, in the above-mentioned program, the call (CALL) command and the return (RET) command can be executed by using jump (JMP and JUMP return) commands.

As the bug in the information stored in the ROM 2 and which can be patched in the above-mentioned apparatus, there can be expected erroneous display on the display unit or the like. That is, when an erroneous display caused by the bug on the program, then such erroneous display is erased by the patch program after the erroneous display was made. Alternatively, if a correct display is made, then an instantaneous erroneous display can be immediately patched although the erroneous display occurs. Therefore, the users will not know such erroneous display.

It is expected that bugs on the information stored in the ROM 2 and which can be patched by the above-mentioned apparatus constitute about 30 to 40% of all bugs. Accordingly, if the bugs cannot be patched by the above-mentioned apparatus, then the electronic devices, etc., must be mass-produced one more time. However, patching of the bugs within the above ratio which can be patched can achieve remarkably large effects from a manufacturing standpoint.

According to the present invention, the bug on the information stored in the fixed memory means is patched by the information from the variable memory means. Therefore, the bug that was discovered after the electronic device had been mass-produced can patched without changing the design of the existing electronic device.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. An electronic device comprising:

input means for receiving patch information input from a source external to the electronic device;

first memory means which is a read-only memory (ROM), and in which information is stored in a fixed state and the information stored in the first memory means includes a call command which calls a predetermined address;

second memory means, including the predetermined address, in which the patch information input to the input means is stored starting at the predetermined address, and in which a return command is stored at an end of the patch information;

processing means for processing in accordance with the information stored in the first memory means and the second memory means, for processing the call command stored in the first memory means, and for processing the patch information starting at the predetermined address in the second memory means when the call command is processed; and writing means for writing the patch information from the input means into the second memory means;

with the first memory means, the processing means, the input means and the second memory means being unitarily integrated as a one-chip microcomputer, whereby the processing of the patch information will patch a bug of the information stored in the first memory means.

2. The electronic device according to claim 1, wherein the call command is stored in the first memory means at a location such that the call command will be processed by the processing means at each one of predetermined processing cycles of the processing means.

3. The electronic device according to claim 1, further comprising detecting means for detecting whether or not the patch information has been received by the input means.

4. The electronic device according to claim 3, wherein the writing means writes the patch information in the second memory means when it is detected by the detecting means that the patch information has been received by the input means.

5. The electronic device according to claim 4, wherein the patch information includes a return command such that when the processing means processes the return command stored as part of the patch information in the second memory means, then the processing means will return to processing information stored in the first memory means.

6. The electronic device according to claim 3, such that when the detecting means detects that the patch information has not been received by the input means, then the writing means will write a return command into the second memory means at the predetermined address, such that when the processing means processes the return command written in the second memory means, then the processing means will return to processing information stored in the first memory means.

7. The electronic device according to claim 1 wherein the second memory means is a random access memory (RAM).

8. The electronic device according to claim 1, wherein the return command returns processing to a location of the call command in the first memory means.

9. A method of processing data stored in memories by a processing means in an electronic device which has a first memory, which is a read-only memory (ROM), and a second memory, the method comprising the steps of:

inputting patch information from a source external to the electronic device to an input means of the electronic device;

writing the patch information from the input means to the second memory starting at a predetermined address of the second memory by a writing means;

processing, by the processing means, a call command stored in the first memory such that the call command directs the processing means to begin processing the patch information starting at the predetermined address of the second memory, whereby processing the patch information will patch a bug caused by processing the information stored in the first memory means; and processing, by the processing means, a return command at the end of the patch information such that the return command directs the processing means to return to processing the information stored in the first memory at a location of the call command.

* * * * *